United States Patent
Meyers

(10) Patent No.: US 9,933,607 B2
(45) Date of Patent: Apr. 3, 2018

(54) MICROSCOPE OBJECTIVE

(71) Applicant: General Electric Company, Schenectady, NY (US)

(72) Inventor: Mark Marshall Meyers, Mechanicsville, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 710 days.

(21) Appl. No.: 14/453,468

(22) Filed: Aug. 6, 2014

(65) Prior Publication Data

US 2016/0041379 A1 Feb. 11, 2016

(51) Int. Cl.
*G02B 21/36* (2006.01)
*G02B 21/02* (2006.01)
*G02B 21/00* (2006.01)

(52) U.S. Cl.
CPC .......... *G02B 21/36* (2013.01); *G02B 21/008* (2013.01); *G02B 21/02* (2013.01)

(58) Field of Classification Search
CPC ....... G02B 21/008; G02B 21/02; G02B 21/36
USPC .......................................................... 348/80
See application file for complete search history.

(56) References Cited

U.S. PATENT DOCUMENTS

| 2,533,371 | A | * | 12/1950 | Heine | ............ | G02B 21/02 |
| | | | | | | 359/660 |
| 4,865,432 | A | * | 9/1989 | Aoyagi | ............ | G02B 7/10 |
| | | | | | | 359/696 |
| 6,191,423 | B1 | | 2/2001 | Krijn et al. | | |
| 6,504,656 | B1 | * | 1/2003 | Winterot | ............ | G02B 15/173 |
| | | | | | | 359/689 |
| 6,563,634 | B2 | | 5/2003 | Shimada et al. | | |
| 6,605,810 | B1 | | 8/2003 | Haider et al. | | |
| 6,934,226 | B2 | | 8/2005 | Yasuda et al. | | |
| 7,265,920 | B2 | | 9/2007 | Boldt | | |
| 7,576,910 | B2 | | 8/2009 | Terada et al. | | |

(Continued)

FOREIGN PATENT DOCUMENTS

| JP | 2005-17454 A | 1/2005 |
| JP | 2005-17643 A | 1/2005 |

(Continued)

OTHER PUBLICATIONS

Zeiss, "Celldiscoverer 7, Your Automated Platform for Live Cell Imaging," Retrieved from the Internet URL: https://www.zeiss.com/microscopy/us/products/imaging-systems/celldiscoverer-7.html, on Mar. 7, 2017, pp. 1-4.

(Continued)

*Primary Examiner* — Anner Holder
(74) *Attorney, Agent, or Firm* — Pabitra K. Chakrabarti

(57) ABSTRACT

Provided here are microscope objectives that include a first plurality of lenses positioned within the passageway on a sample end of the microscope objective and a second plurality of lenses positioned within the passageway and spaced apart from the first plurality of lenses and opposite the sample end such that the first plurality of lenses and the second plurality of lenses are aligned along an imaging axis and such that each individual lens is rotationally symmetrical about the imaging axis. Also included is a motor configured to move a carrier along the imaging axis to change a distance between each lens of first plurality of lenses relative to at least one lens of the second plurality of lenses.

14 Claims, 8 Drawing Sheets

(56) References Cited

U.S. PATENT DOCUMENTS

| | | |
|---|---|---|
| 7,825,360 B2 | 11/2010 | Karasawa et al. |
| 8,035,086 B2 | 10/2011 | Hirayama et al. |
| 8,964,288 B2 | 2/2015 | Cooper |
| 2004/0160653 A1 | 8/2004 | Falk |
| 2006/0176548 A1 | 8/2006 | Terada et al. |
| 2010/0033812 A1 | 2/2010 | Fomitchov et al. |
| 2011/0082590 A1* | 4/2011 | Fahlbusch .............. G02B 7/023 700/275 |
| 2011/0211106 A1 | 9/2011 | Marks et al. |
| 2013/0100537 A1 | 4/2013 | Matthae et al. |

FOREIGN PATENT DOCUMENTS

| | | |
|---|---|---|
| JP | 2005-31507 A | 2/2005 |
| JP | 2005-43624 A | 2/2005 |

OTHER PUBLICATIONS

International Search Report and Written Opinion issued in connection with related PCT Application No. PCT/US2008/052158 dated Jul. 8, 2008.

Notice of Allowance towards related U.S. Appl. No. 12/523,066 dated Jun. 27, 2011.

Patent Examination Report No. 1 issued in connection with related AU Application No. 2008216576 dated Aug. 17, 2012.

Extended European Search Report and Opinion issued in connection with related EP Application No. 38728360.2 dated Feb. 6, 2012.

Search Report issued in connection with related JP Application No. 2009-549166 dated Oct. 31, 2012.

Notification of Reasons for Refusal issued in connection with related JP Application No. 2009-549166 dated Oct. 30, 2013.

Decision to Grant issued in connection with related JP Application No. 2009-549166 dated Mar. 11, 2014.

First Examination Report issued in connection with related in Application No. 3621/DELNP/2009 dated Aug. 31, 2016.

Lentzen, "Progress in Aberration-Corrected High-Resolution Transmission Electron Microscopy Using Hardware Aberration Correction", Microsc. Microanal, vol. 12, Issue 3, pp. 191-205, Jun. 2006.

Norris et al., "Methanol immersion reduces spherical aberration of water dipping lenses at long wavelengths used in multi-photon laser scanning microscopy", Biomed Opt Express, vol. 3, Issue 12, pp. 3314-3324, Dec. 1, 2012.

U.S. Appl. No. 12/523,066, filed Jul. 14, 2009, Fomitchov et al.

* cited by examiner

MICROSCOPE OBJECTIVE

BACKGROUND

The subject matter disclosed herein relates to imaging and, in particular, integrated microscope objectives.

Spherical aberration occurs in lenses because light is refracted differently near the edge of a lens relative to how it is refracted at its center. The contrast and sharpness of an image captured with a high numerical aperture microscope objective is dependent on how well corrected the spherical aberration of the system is. However, the format of a sample being imaged by a microscope may also change the total spherical aberration observed in the image. For example, the sample may be mounted on substrates that are available in a variety of thicknesses. Further, the substrate thickness will depend on if the sample is placed with the slide or the coverslip facing the objective or, alternatively, if the sample is positioned on a thick plastic bottom of the well plate. Accordingly, additional spherical aberration may be introduced via the sample and its particular substrate, and sample-dependent spherical aberration may be difficult to compensate for in microscopes that are calibrated for only certain sample substrate types and/or thicknesses.

BRIEF DESCRIPTION

In one embodiment, an imaging system is provided that includes a microscope objective. The microscope objective includes a housing; a sleeve forming a passageway in housing; a first plurality of lenses positioned within the passageway on a sample end of the microscope objective; a second plurality of lenses positioned within the passageway and spaced apart from the first plurality of lenses and opposite the sample end such that the first plurality of lenses and the second plurality of lenses are aligned along an imaging axis and such that each individual lens is rotationally symmetrical about the imaging axis; a carrier coupled to the first plurality of lenses and positioned at least partially within the passageway; a motor coupled to the carrier and configured to move the carrier along the imaging axis to change a distance between each lens of first plurality of lenses relative to at least one lens of the second plurality of lenses. The imaging system also includes a processor coupled to the motor and configured to provide instructions to drive the motor.

In another embodiment, a method is provided that includes the steps of acquiring first image data from a sample on a substrate having a thickness using a microscope objective with a spacing between a fixed group of lenses and at least one lens of a moving group of lenses at a first distance; providing instructions to a motor housed within the microscope objective to change the spacing to a second distance different from the first distance; acquiring second image data from the sample using the microscope objective with the spacing at the second distance; comparing the first image data to the second image data to select the first spacing and not the second spacing if the first spacing is associated with better focusing or to select the second spacing and not the first spacing if the second spacing is associated with better focusing; and acquiring third image data from the sample using the first spacing and not the second spacing if the first spacing is associated with better focusing or using the second spacing and not the first spacing if the second spacing is associated with better focusing.

In another embodiment, a system is provided that includes a processor configured to execute instructions. The instructions include instructions to receive first image data of a sample, wherein the sample is mounted on a substrate having a thickness; determine if the first image data has excessive spherical aberration; instruct a motor within a housing of a microscope objective to change a spacing distance between a first group and a second group of lenses aligned along an imaging axis, wherein the motor is configured to move the entire first group relative to the second group along the imaging axis to achieve a new spacing distance when the first image data is associated with spherical aberration; receive second image data of the sample at the new spacing distance; determine if the second image data has reduced spherical aberration relative to the last image; and utilize the microscope objective spacing associated with the lowest spherical aberration. The system also includes a memory for storing the motor position information for specific samples.

Another aspect of the disclosed embodiments is that the system can be pre set with spacings for typical substrate thickness, such as the 1 mm slide, the 0.8 mm plastic well plate and the 0.17 mm coverslip, and can start with the internal spacings set to one of these substrates. The sharpness can then be optimized by making small adjustments around these set points.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
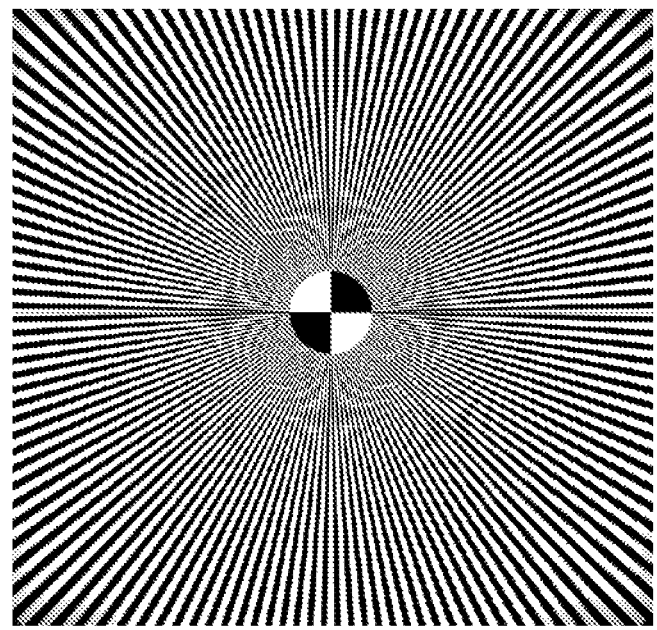
FIG. 1 is a schematic slide image with correct spherical aberration correction.
Figure 2:
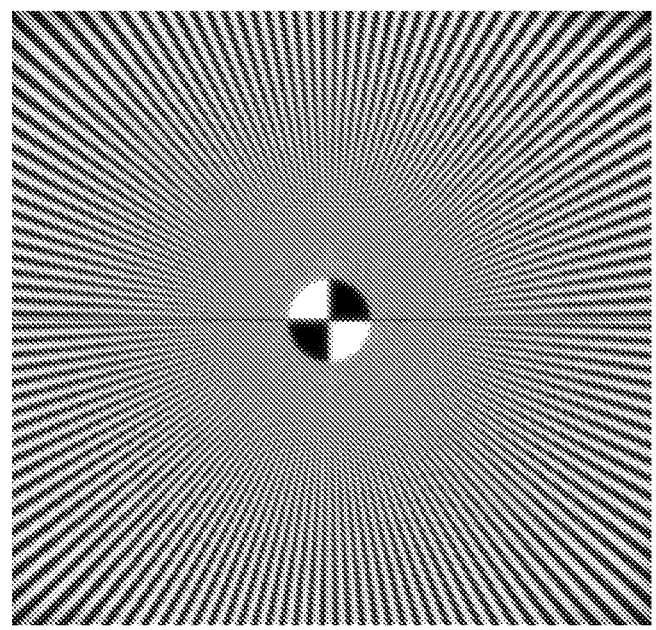
FIG. 2 is a schematic slide image for a substrate of different thickness with incorrect spherical aberration correction using the same settings for the slide thickness correction of FIG. 1.

Sample substrates of imaged objects (e.g., slides) may introduce an amount of spherical aberration into a converging beam that depends on the thickness of the substrate. Microscopes that are not equipped with spherical aberration compensation may suffer image sharpness degradation when they are viewed through substrates with non-optimal thicknesses. The quality of the images captured with the microscope is significantly reduced if the spherical aberration (SA) of the substrate is not correctly compensated for. FIG. 1 is a schematic image of a resolution target on a 1 min thick slide with correct spherical aberration correction setting, and FIG. 2 is a schematic image of a the resolution target when imaged through the 0.17 mm thick coverslip using the same SA settings for the 1 mm slide thickness correction without taking into account the coverslip thickness. FIG. 2 is blurry and low contrast relative to FIG. 1, which is a schematic representation imaged with the proper setting for spherical aberration correction. A microscope without spherical aberration compensations may be limited to being used with a specific substrate or coverslip thickness provided as a microscope specification. However, operators may wish to image samples from a wide variety of sources and that are prepared on a wide variety of substrates. Further, repositioning such samples on microscope-specified substrates may damage the sample.

In order to achieve high quality imaging for the microscope over a range of substrate thicknesses the spherical aberration collar in the objective lens should be adjusted to compensate for the spherical aberration caused by the thickness of the substrate being used. Provided herein is a microscope objective with a correction mechanism that corrects for spherical aberration and that is built directly into the body of the objective. The objective compensates for changes in spherical aberration by adjusting the air space between the fixed group of lens elements and a moving compensation group. The mechanism is actuated by a motor mounted as an integral part of the objective. The position of the spherical aberration compensator is controlled by the microscope's central control hardware and is connected through an electrical connector on the side of the objective housing. The level of spherical aberration correction required can be set by the user through the control software or can be determined by a sensor coupled to the objective.

The presently disclosed embodiments may be implemented with a closed or user-inaccessible microscope objective. This is in contrast to manually adjustable microscope objectives that, for example, allow the user to manually adjust the setting of a rotatable collar. Such an implementation requires the user to have access to the objective turret. While such an approach is compatible with open frame microscopes, other microscopes have the objective turret housed within the body of the instrument, where the user would not be able to manually adjust the collar setting. Another approach involves an external mechanical actuator that couples to and displaces a collar on an objective with a manually adjustable collar. However, such an approach may introduce reliability issues due to misalignment of the interfaces between the collar and the mechanical actuator or slippage of the actuator. The disclosed techniques may be implemented in conjunction with closed or inaccessible objective turrets to facilitate remotely adjusting the SA setting without accessing the objective turret and without introducing reliability or alignment issues.

Figure 3:
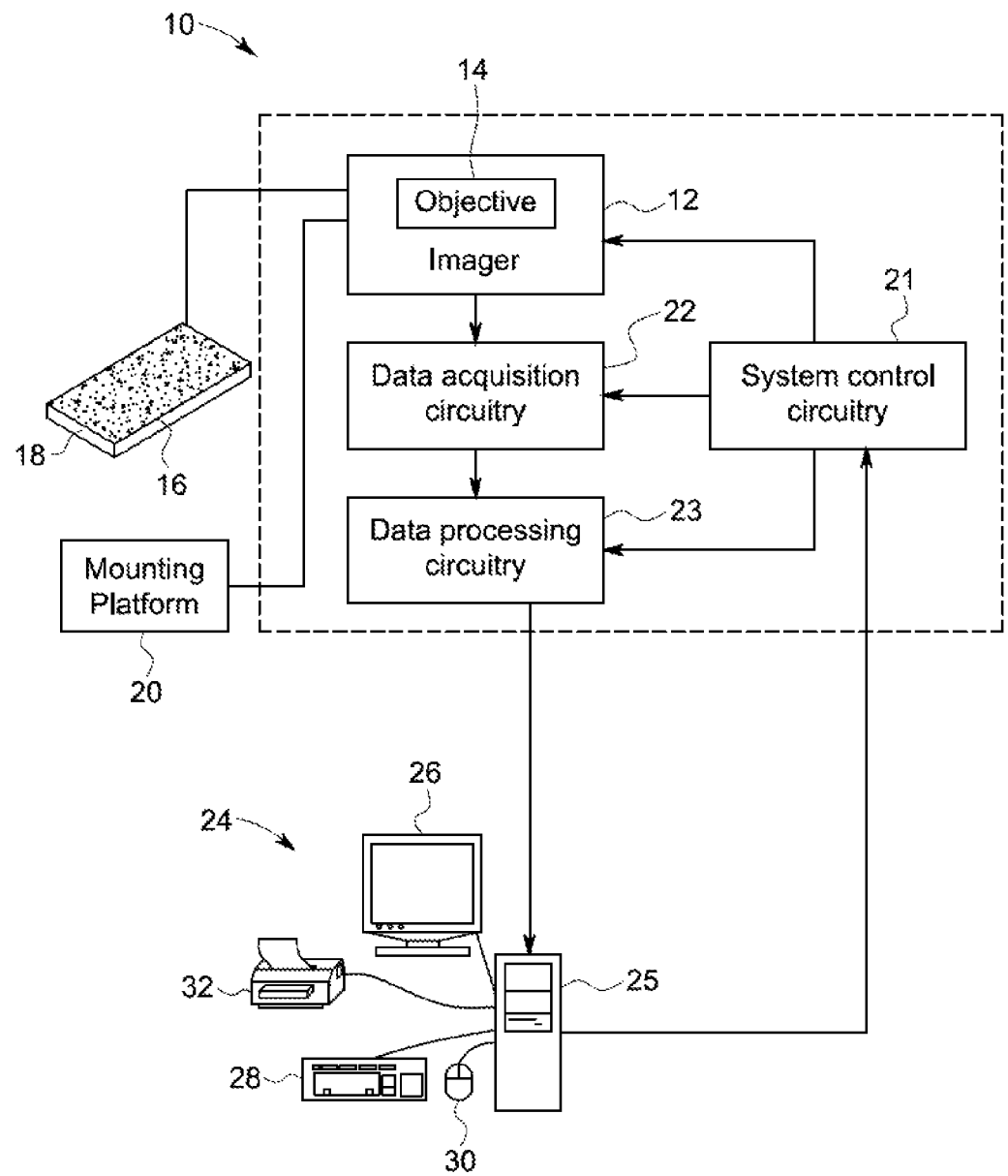
FIG. 3 is a diagrammatical view of an exemplary system for use in acquiring image data with a microscope objective in accordance with certain embodiments of the disclosure.

An exemplary imaging system 10 including a microscope objective which is capable of operating in accordance with the present technique is depicted in FIG. 3. Generally, the imaging system 10 includes an imager 12 that detects spirals and converts the signals to data that may be processed by downstream processors. The imager 12 may operate in accordance with various physical principles for creating the image data and may include a fluorescent microscope, a bright field microscope, or devices adapted for suitable imaging modalities. Further, the imager 12 may include a microscope objective 14 that gathers light from the imaged sample 16. The acquired image may be a digital image or a film image. In general, the imager 12 creates image data indicative of the sample 16, which may be any material of interest, including biological samples, environmental samples, chemical samples, etc.

As shown, the sample 16 is mounted on a substrate 18. The substrate 18 may be a slide having a particular thickness or the window of a well plate, which in turn has a particular thickness that may be different than that of a slide. When the sample is mounted on a mounting platform 20 coupled to the imager 12, different thickness substrates require adjustments to the internal spacings between the fixed and moving groups, as well as refocusing the objective to a new best focus position with the optimal spherical aberration correction. As provided herein, the system 10 is configured to account for these sample-dependent distance variations and their resultant spherical aberration. In particular embodiments, depending on the specifications of the imager 12, the correction may be provided for certain substrate thicknesses, e.g., a substrate in a range of 0 (no substrate) to 1.5 min in thickness. Accordingly, an operator may be provided with guidance via the system interface to select substrates within the correctable range.

The imager 12 operates under the control of system control circuitry 21. The system control circuitry 21 may include a wide range of circuits, such as illumination source control circuits, timing circuits, circuits for coordinating data acquisition in conjunction with sample movements, circuits for controlling the position of light sources and detectors, and so forth. In the present context, the system control circuitry 21 may also include computer-readable memory elements, such as magnetic, solid state, electronic, or optical storage media, for storing programs and routines executed by the system control circuitry 21 or by associated components of the system 10. The stored programs or routines may include programs or routines for performing all or part of the present technique.

Image data acquired by the imager 12 may be processed by the imager 12, for a variety of purposes, for example to convert the acquired data or signal to digital values, and provided to data acquisition circuitry 22. The data acquisition circuitry 22 may perform a wide range of processing functions, such as adjustment of digital dynamic ranges, smoothing or sharpening of data, as well as compiling of data streams and files, where desired.

The data acquisition circuitry 22 may also transfer acquired image data to data processing circuitry 23, where additional processing and analysis may be performed. Thus, the data processing circuitry 23 may perform substantial analyses of image data, including ordering, sharpening, smoothing, feature recognition, and so forth. In addition the data processing circuitry 23 may receive data for one or more sample sources, (e.g. multiple wells of a multi-well plate). The processed image data may be stored in short or long term storage devices, such as picture archiving communication systems, which may be located within or remote from the imaging system 10 and/or reconstructed and displayed for an operator, such as at the operator workstation 24.

In addition to displaying the reconstructed image, the operator workstation 24 may control the above-described operations and functions of the imaging system 10, typically via an interface with the system control circuitry 21. The operator workstation 24 may include one or more processor-based components, such as general purpose or application specific computers 25. In addition to the processor-based components, the computer 25 may include various memory and/or storage components including magnetic and optical mass storage devices and/or internal memory, such as RAM chips. The memory and/or storage components may be used for storing programs and routines for performing the techniques described herein that are executed by the operator workstation 24 or by associated components of the system 10. Alternatively, the programs and routines may be stored on a computer accessible storage medium and/or memory remote from the operator workstation 24 but accessible by network and/or communication interfaces present on the computer 25.

The computer 25 may also comprise various input/output (I/O) interfaces, as well as various network or communication interfaces. The various I/O interfaces may allow communication with user interface devices, such as a display 26, keyboard 28, mouse 30, and printer 32, that may be used for viewing and inputting, configuration information anchor for operating the imaging system 10. The various network and communication interfaces may allow connection to both local and wide area intranets and storage networks as well as the Internet. The various I/O and communication interfaces may utilize wires, lines, or suitable wireless interfaces, as appropriate or desired.

More than a single operator workstation 24 may be provided for an imaging system 10. For example, an imaging system or station may include an operator workstation 24 which permits regulation of the parameters involved in the image data acquisition procedure, whereas a different operator workstation 24 may be provided for manipulating, enhancing, and viewing results and reconstructed images. In addition, the workstation 24 may be used in conjunction with the present techniques to display information related to spherical aberration correction and for provide an interface for an operator to provide input or instructions to the microscope objective 14 related to spherical aberration correction.

Figure 4:
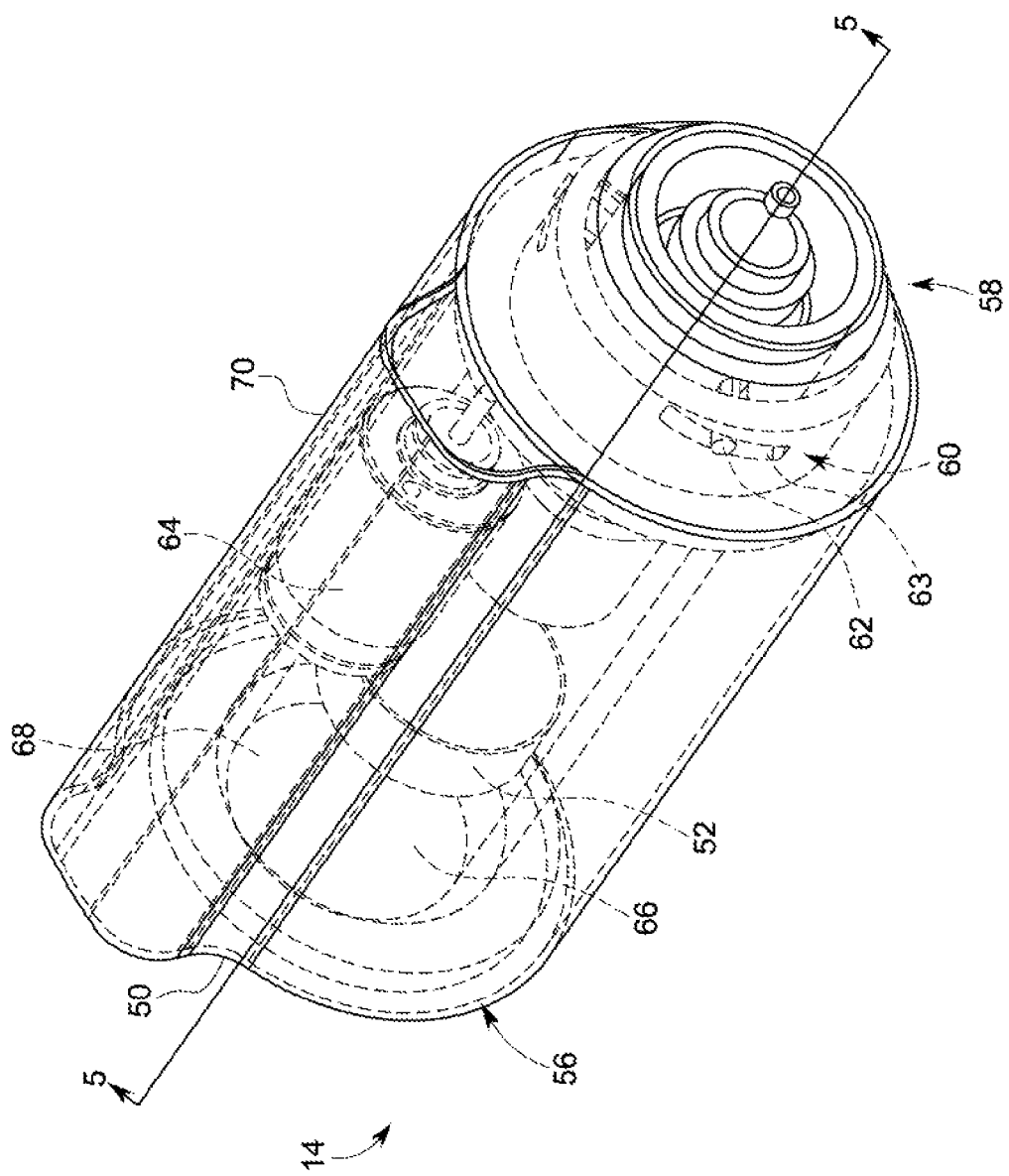
FIG. 4 is a perspective view of a microscope objective that may be used in conjunction with the system of FIG. 3 in accordance with certain embodiments of the disclosure.

Provided herein are techniques to account for changes in spherical aberration associated with different thickness substrates by adjusting the air space between a fixed group and a compensating group of lenses in a microscope objective. FIG. 4 is a partial cut-away perspective view of a microscope objective that may be used in conjunction with the system of FIG. 3. The microscope objective 14 is encased within a housing 50 that encircles the lenses 52. The microscope objective 14 may have any suitable number of lenses 52, depending in the specification of the image 12. The lenses may be generally arranged along an axis within the objective 14 to focus the objective 14 during imaging. The objective 14 has a microscope coupling end 56 that couples to the imager 12 and a sample end 58 that is positioned nearest to the sample 16. When the objective 14 is in place, the internal components of the objective 14 are closed off from user manipulation.

As noted, the microscope objective 14 includes a plurality of lenses 52. A group of lenses 52 are capable of being displaced within the objective and relative to other fixed lenses 52 to correct for spherical aberration. In one embodiment, the lenses 52 that are capable of being displaced are coupled to a carrier 60 that is positioned at the sample end 58, and the carrier 60 may include one or more carrier elements, such as nested elements coupled together by a pin 62, that are in turn coupled to a compensating group of lenses 52 while other lenses 52 are fixed (e.g., not couple to the carrier 60). The objective 14 also includes a motor 64 that is configured to move only a portion of the lenses 52 relative to fixed components of the objective 14 to collect for spherical aberration. The motor 64 may move within a passageway 68 to move the lenses 52 within the lens passageway 66. Alternatively, the motor 64 may be a stepper or de brushless motor that provides rotational motion with the passageway 68 that is converted to linear motion via coupling to a cam that is in turn directly or indirectly coupled to the carrier 60. As noted, the moving parts are enclosed within the housing 50 such that the movement of the lenses 52 is controlled by controlling the movement of the motor 64, which may be controlled by the system control circuitry 21 (see FIG. 3). The objective 14 may form a generally cylindrical shape to accommodate the lenses 52 and the lens passageway 66, and may also include a bump 70 to accommodate the motor passageway 68. The motor 64 and the diameter of the motor passageway 68 may be selected to be relatively smaller than the lens passageway 66 to allow the objective 14 to be retrofitted to a variety of existing imaging platforms that were designed to be used with objectives without motors.

Figure 5:
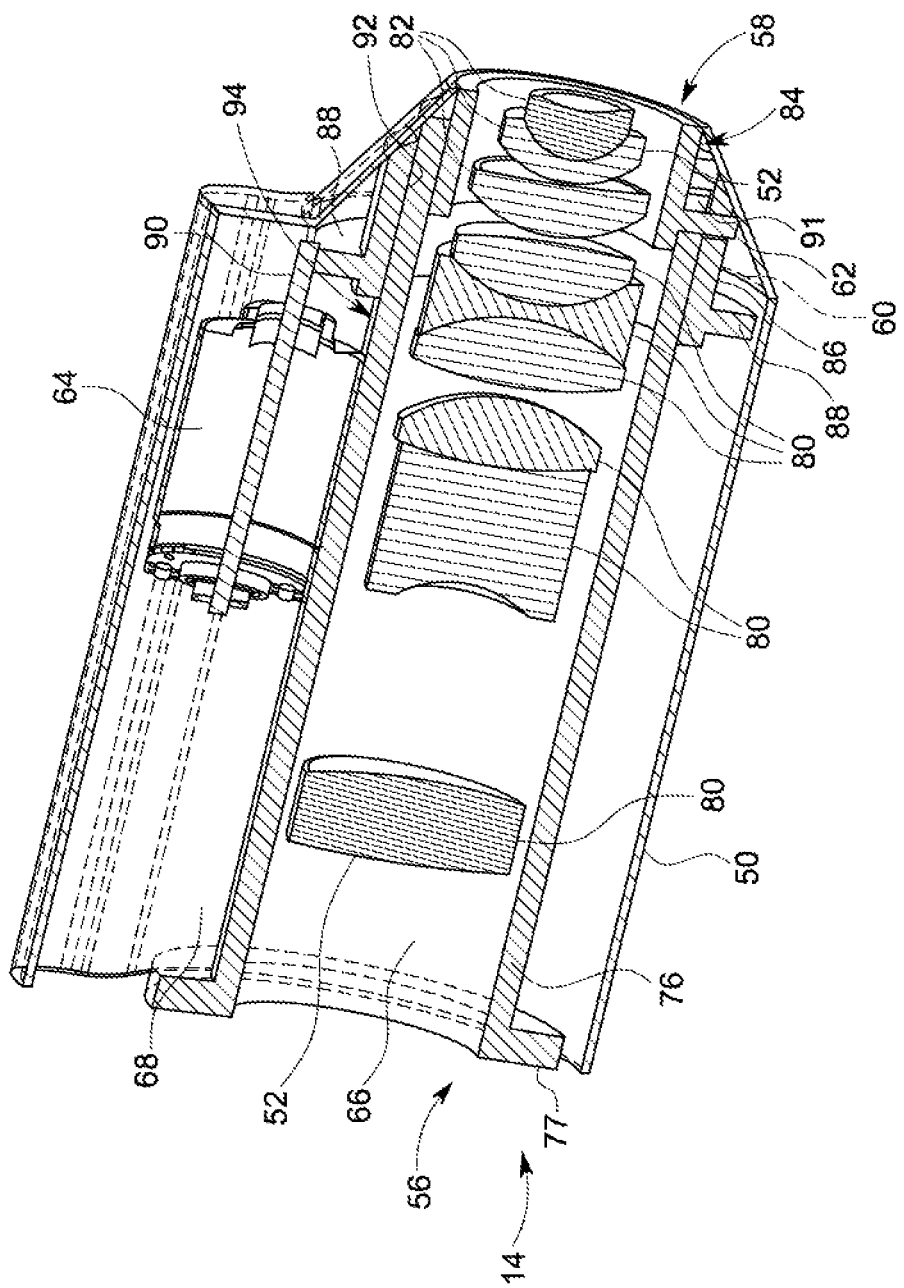
FIG. 5 is a cross-sectional view of the microscope objective of FIG. 4 in accordance with certain embodiments of the disclosure.

FIG. 5 is a cross-section of the objective of FIG. 4. As shown, the exterior housing 50 encloses a sleeve 76 that forms the lens passageway 68. The sleeve 76 may terminate in a flange 77 at the imager end 56 of the objective 14 or in any suitable structure that facilitates coupling of the objective 14 to the image 12 (see FIG. 3). In one embodiment, the objective 14 includes a fixed group 80 of lenses 52 and a compensator group 82 that is a group of moving lenses located at the sample end 58 of the objective 14. While the depicted embodiment shows 3 lenses 52 as part of the compensator group 82 and 6 lenses 52 as part of the fixed group 80, it should be understood that other implementations are envisioned, and the fixed group 80 and/or the compensating group 82 may have other lens configurations.

The compensating group 82 is coupled to the carrier 60, which, in the depicted embodiment, includes a forward piece that directly engages the lenses 52 in compensating group and a back piece 86 with a terminal flange 88. The back piece 86 is coupled to the forward piece 84 via the Cylindrical CAM 62 as well as to a drive shaft 90 which drives the flange 88. Actuation of the motor 64 results in movement of the drive shaft 90. The drive shaft can be connected to the rotary CAM 62 via friction or via a spur gear that drive a section of a Rear attached to the rotary CAM. The lenses are mounted within a separate cylindrical barrel that is displaced as the pins that protrude from the lens barrel are swept forward by the slots 63 in the rotary CAD. The objective focus is adjusted by moving the entire objective relative to the sample. By using a compact motor, and displacement mechanism, the objective 14 is implemented to allow the objective and spherical aberration compensator to be formed as an integrated unit that can be mounted directly to the microscope turret without requiring a separate mechanism to adjust the spherical aberration correction. In order to adjust the spherical aberration compensation, an electrical signal is provided by the machine controller to the motor 64. In another embodiment, a lead screw drive provides the movement of the compensating group 82 relative to the fixed group 80 of the objective 14. In this embodiment, the fixed group 80 is mounted within the sleeve 76 which has a slot to constrain the translation of the compensating group 82 to be along the optical axis. The compensating group 82 and the carrier 60 is driven by the nut on a lead screw which is attached to the pin 62 connected to the forward piece 84 and that passes through the slot 91 in the fixed collar. The movement of the rod 90 caused by the motor 64 may be a simple vertical displacement. In other embodiments, the motor 64 may cause an associated cam to move in a circumferential path to cause the vertical displacement of the rod 90. The dimensions of the slot 91 may be selected to provide desired limits to the possible movement of the compensating group 82. Movement of the carrier 60 may include movement of the forward piece 84 either within the sleeve 76 (i.e., towards the imager end 56) or to protrude more from the sleeve 76. As such the forward piece 84 may be implemented to have a slightly smaller outer diameter than the lens passageway 66 to facilitate movement in and out of the sleeve 76. Further, an interior wall 92 of the back piece 86 concurrently moves about an exterior wall 94 of the sleeve 76 during motion. In another embodiment, a piezoelectric actuator may be used to adjust the airspace between the fixed 80 and compensating lens group 82. The range of the piezo displacement can be amplified by using a lever arm to provide a larger displacement while utilizing the piezo as the actuator.

Figure 6:
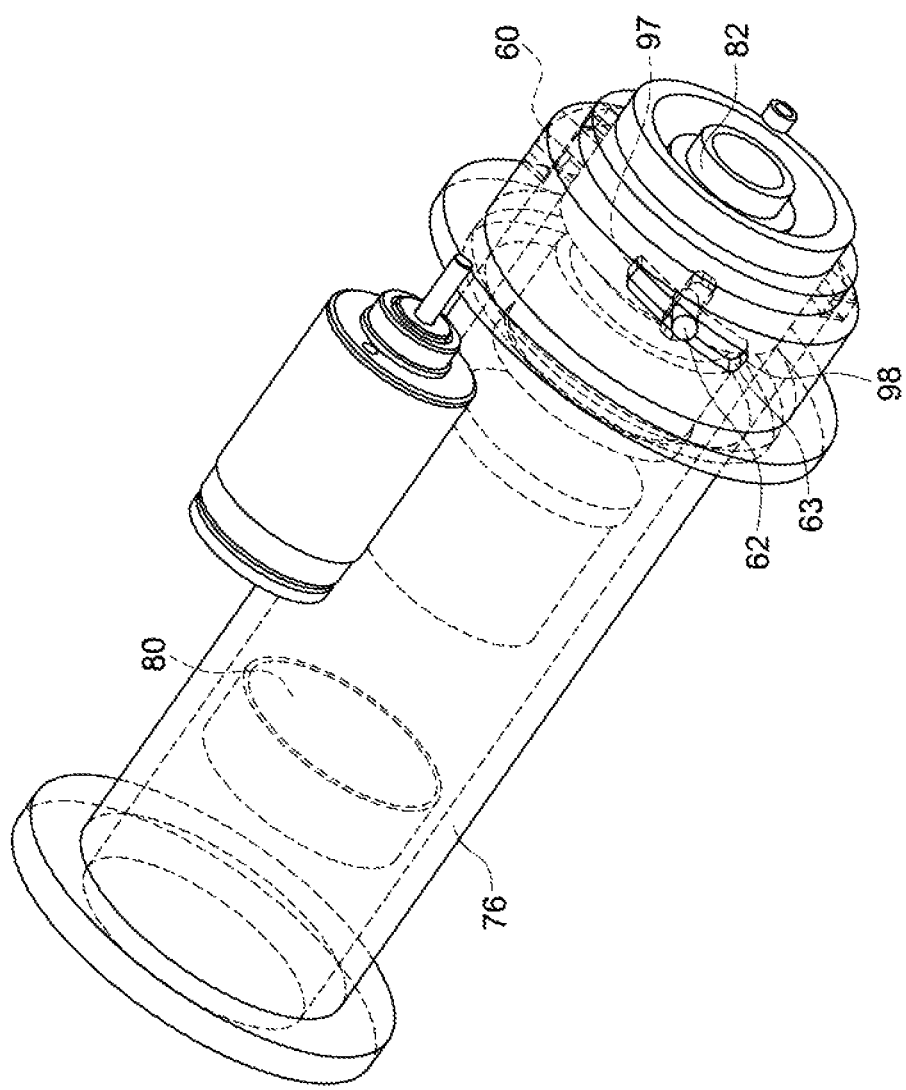
FIG. 6 is a partial cutaway perspective view of the microscope objective of FIG. 4 in accordance with certain embodiments of the disclosure.

FIG. 6 is a partial cutaway perspective view of the objective of FIG. 4. In the depicted embodiment, the objective includes three pins 62, protruding radially from the barrel, located at 120 degrees apart around the circumference. However, it should be understood that any number of pins 62 may be used. The use of the dowel pins 62 and the fit between the outer barrel (e.g., sleeve 76) and the rotating inner barrel (e.g., carrier 60) allows the compensating group 82 to translate linearly, without rotating, and do so with a very tight centration tolerance (e.g., 5 um).

Figure 7:
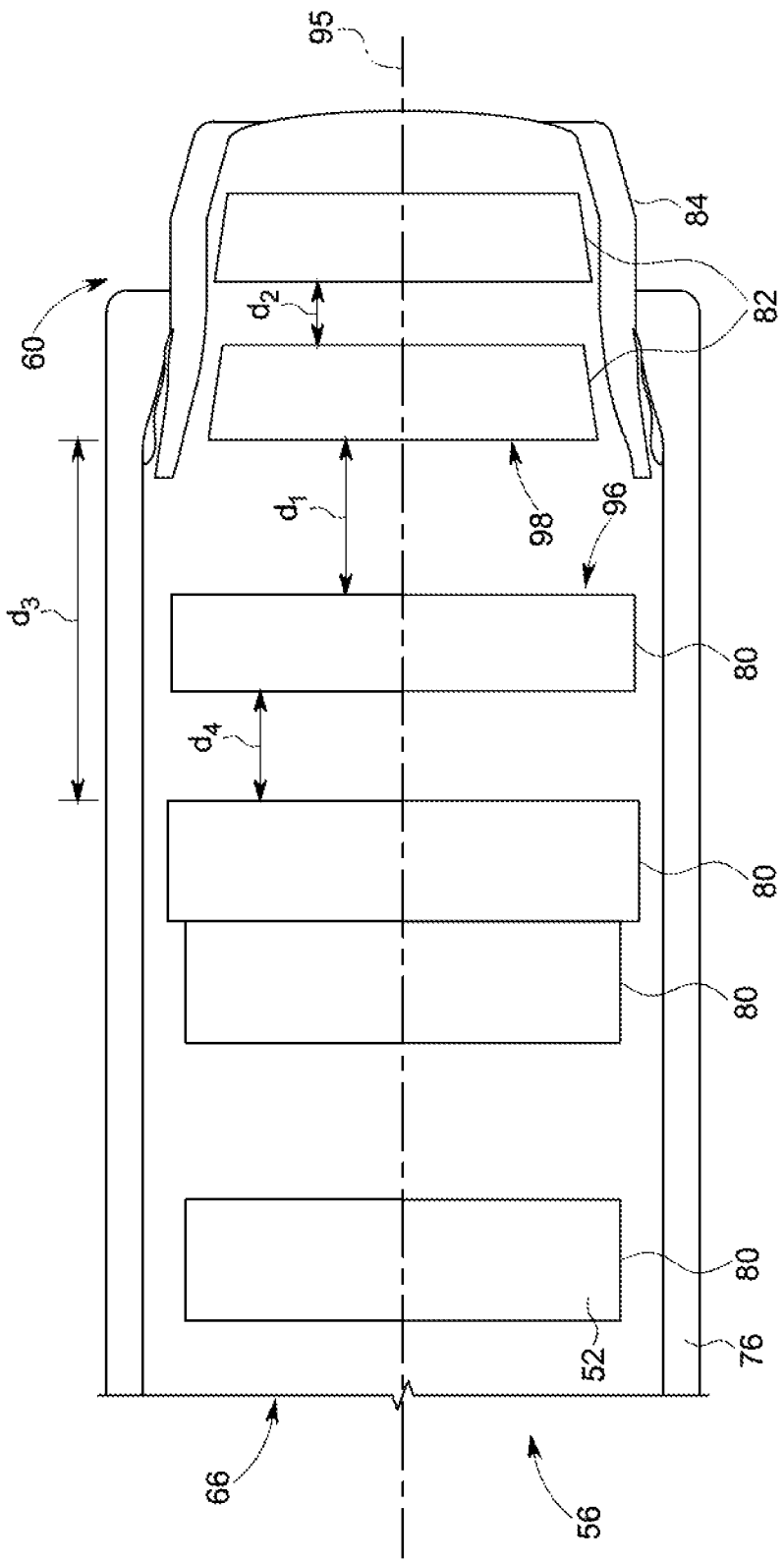
FIG. 7 is a cross-sectional view of the lens components of an exemplary microscope objective that may be used in conjunction with the system of FIG. 3 in accordance with certain embodiments of the disclosure.

The rotating collar of the carrier 60 may have a gear tooth pattern on it that interfaces with the spur gear on the drive shaft 90 of the stepper motor 64. As the motor 64 turns the rotating collar rotates, and the slots 63 in the rotating collar set the linear displacement of the front group. This displacement can be a linear or polynomial function of rotation angle. For example, as shown, the slots 63 are oriented at an angle such that the ends 97 and 98 are non-orthogonal to axis (i.e., imaging axis 95 of FIG. 7) The rotating collar is nested in the fixed lens barrel sleeve 76 that is attached to the microscope body FIG. 7 is a detail cross-sectional view of an exemplary sleeve 76, including fixed 80 and compensating $2 lens groups. The movement of the compensating group 82 of lenses 52 is along the imaging axis 95. The compensating group 82 moves together, such that the displacement of each individual lens 52 of the compensating group is the same. Accordingly, while the absolute distance of the fixed group 80 to the compensating group 82 may be measured from any member of the compensating group relative to any fixed lens 52 of the fixed group, the change in distance should be the same for all members of the compensating group 82. For example, in one embodiment, the distance considered may be a distance $d_1$ from a bottom surface 96 of the fixed lens 52 closest to the sample end 58 to a top surface 9$ of the compensating lens 52 closest to the imaging end 56. The absolute distance $d_1$ may change to correct for spherical aberration. However, the distance $d_2$ between two members of the compensating group remains the same, regardless of any change in the distance $d_1$. In other embodiments, distances d3 or d4, or any other distance between a fixed lens 52 and a compensating lens 52 (measured from a top lens surface and/or a bottom lens surface, or a middle of the lens 52) may be considered a change in distance.

Figure 8:
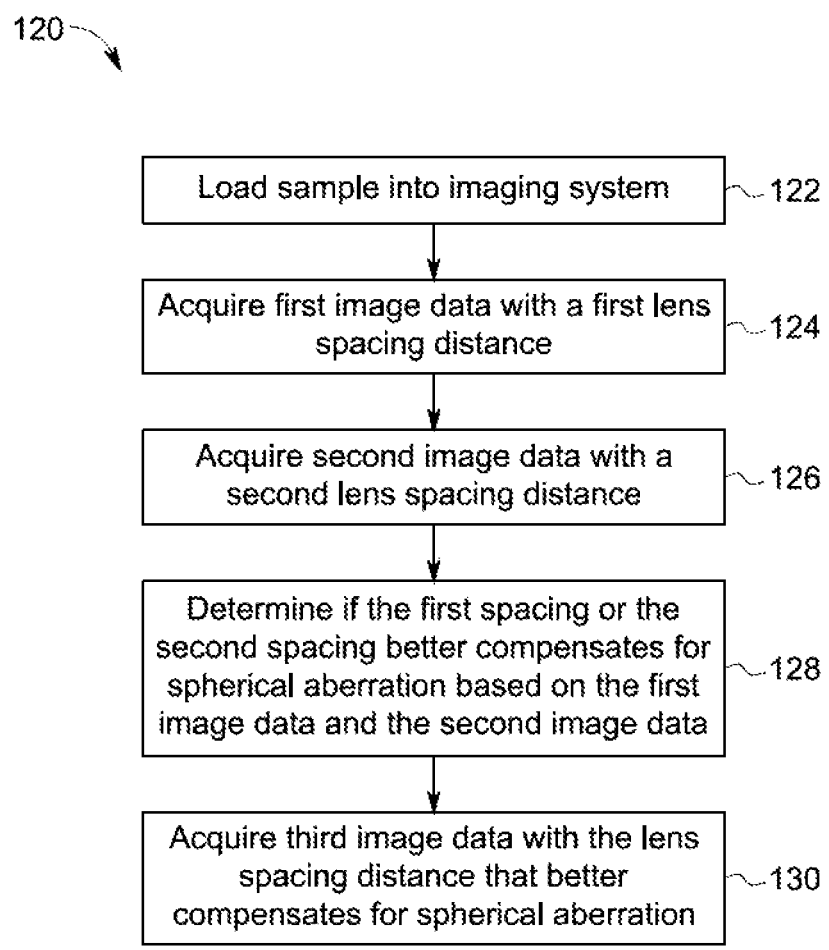
FIG. 8 is a flow diagram of a spherical aberration correction method that may be used in conjunction with certain embodiments of the disclosure.

The movement of the fixed lenses 80 relative to the compensating lenses 82 may correct for spherical aberration from sample substrate effects. The system 10 may be configured to calibrate the sample 16 and the substrate 18 before starting a fall imaging process. FIG. 8 is a flow diagram of a method 120 for calibrating a sample 16. The sample 16 is loaded into the imaging system 10 (block 122) and first image data is acquired at a first lens spacing distance (124). The first lens spacing distance may be a default lens setting. For example, the system 10 may start at the default spacing for all samples, assuming a substrate with a pre-determined thickness. Alternatively, the operator may provide an input to the system 10 as to the substrate type, and the system 10 may space the lenses accordingly. The default lens spacing or request for such input may also be provided as a prompt to the user when the sample is positioned in the imaging field of the objective 14.

The system 10 may then provide instructions to the objective 14 to change to a second lens spacing distance and acquire second image data (block 126). Based on the first image data and the second image data, the system 10 may determine which lens is associated with better images, e.g., which better corrects for spherical aberration (block 128). The spherical aberration determination may be performed by the data processing circuitry 23. Once a preferred lens spacing distance is determined, the system 10 may commence with imaging the sample at the preferred lens spacing distance to acquire third image data (block 130). In certain embodiments, the first image data and the second image data may be lower resolution preliminary image data, while the third image data is higher resolution and for includes additional images. In this manner, the imaging time of the system 10 may be reduced as the initial calibration images are lower resolution.

In one embodiment, the method 120 may acquire additional image data at additional lens spacing distances and select between them for the best correction before acquiring the third image data at block 130. Once a determination of the best spacing is made, the system 10 may also store the spacing associated with that substrate 18 in a memory as a calibration factor. In this manner, the system 10 may include a learning feature. As new substrates 18 are imaged and their spherical aberration is corrected, the system 10 may store the substrates with their associated correction information (i.e., the best lens spacing for imaging). For example, the user may store a slide part number, a slide thickness, etc. When that substrate 18 is provided again, the user may input the slide information and the system 10 may determine if that substrate 18 has been calibrated. If so, the system 10 may use the previous calibration information as the default setting before starting the method 120.

Figure 9:
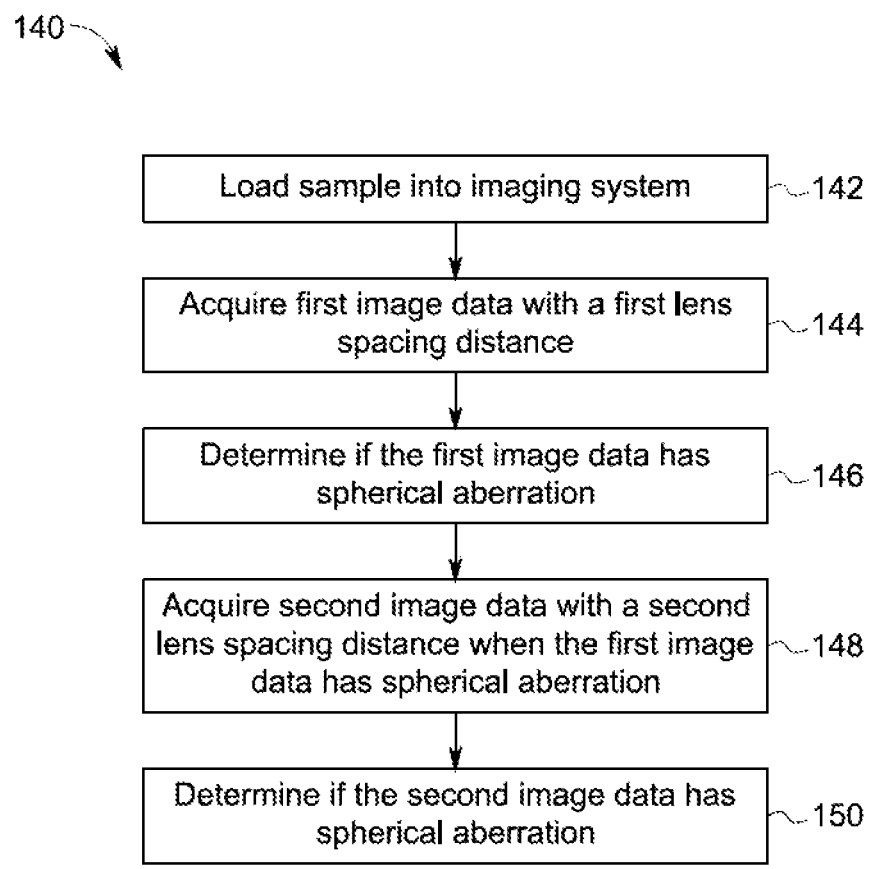
FIG. 9 is a flow diagram of an alternate spherical aberration correction method that may be used in conjunction with certain embodiments of the disclosure.

In another embodiment, the system 10 may only correct, i.e., move the lenses, once spherical aberration has been detected. For example, FIG. 9 is a flow diagram of a method 140 for correcting spherical aberration that includes loading the sample 16 into the imaging system 10 (block 142) and acquired first image data at a first lens spacing distance (124). Again, in certain embodiments, the first lens spacing distance may be a default lens setting, may be automatically determined based on a user input as to a sample substrate 18, or may be retrieved from memory as being a previous calibration associated with a similar substrate 18. The first image data may, in certain embodiments, be preliminary, lower resolution data. If the first image data does not have spherical aberration, the full imaging set may be acquired at the first lens spacing distance. However, if the system determines that first image data has spherical aberration (block 146), the method 120 acquires second image data with a second lens spacing distance (block 148) and determines if the second image data has spherical aberration (block 150). If not, the full imaging set may be acquired at the second lens spacing distance. If so, additional lens spacing may be assessed. In this manner, the system may avoid correction for cases where the default setting is sufficient and may also acquire and store data at multiple lens spacings to assist in future calibrations.

Technical effects of the invention include a microscope objective that is capable of working in closed-platform microscope turrets and that is capable of correcting for spherical aberration without direct user manipulation. As provided herein, a microscope objective may include an integral motor that is configured to displace a group of compensating lenses relative to a fixed group of lenses.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An imaging system, comprising:
a microscope objective, comprising:
at least one closed-platform inaccessible objective turret;
a housing;
a sleeve forming a passageway in housing;
a first plurality of lenses positioned within the passageway on a sample end of the microscope objective;
a second plurality of lenses positioned within the passageway and spaced apart from the first plurality of lenses and opposite the sample end such that the first plurality of lenses and the second plurality of lenses are aligned along an imaging axis and such that each individual lens is rotationally symmetrical about the imaging axis;
a carrier coupled to the first plurality of lenses and positioned at least partially within the passageway;
an integral motor coupled to the carrier and configured to move the carrier along the imaging axis in conjunction with the at least one closed-platform inaccessible objective turret to change a distance between each lens of first plurality of lenses relative to at least one lens of the second plurality of lenses and thereby remotely adjust a spherical aberration (SA) setting of the microscope objective without direct user manipulation; and
a processor coupled to the motor and configured to provide instructions to drive the motor.

2. The imaging system of claim 1, wherein the motor is configured to move the carrier to displace each lens of first plurality of lenses the same distance relative to a starting position such that each respective lens of the first plurality of lenses is fixed in position relative to one another.

3. The imaging system of claim 1, wherein the housing is closed about the first plurality of lenses and the second plurality of lenses and the motor when the microscope objective is positioned within the imaging system.

4. The imaging system of claim 1, wherein the housing is closed about the first plurality of lenses and the second plurality of lenses and the motor when the microscope objective is positioned within the imaging system.

5. The imaging system of claim 1, wherein the carrier is positioned in part within the sleeve and in part extending from a sample end of the sleeve.

6. The imaging system of claim 1, wherein the motor is positioned within a second passageway adjacent to the sleeve.

7. The imaging system of claim 6, wherein an exterior wall of the sleeve forms a portion of an interior wall of the second passageway.

8. The imaging system of claim 6, wherein the first passageway is larger than the second passageway.

9. The imaging system of claim 6, wherein the housing forms a cylindrical shape conforming to the first passageway and a protrusion conforming to the second passageway.

10. The imaging system of claim 1, wherein the first plurality of lenses comprises 3 or more lenses.

11. The imaging system of claim 10, wherein the second plurality of lenses comprises 6 or more lenses.

12. The imaging system of claim 1, wherein each lens of the second plurality of lenses is fixed in position within the passageway.

13. The imaging system of claim 1, wherein the carrier is configured to move the first plurality of lenses away from the second plurality of lenses along the axis to increase the distance.

14. The imaging system of claim 1, wherein the carrier is configured to move the first plurality of lenses towards the second plurality of lenses along the axis to decrease the distance.

* * * * *